(12) United States Patent
Cochrane

(10) Patent No.: US 8,886,608 B2
(45) Date of Patent: Nov. 11, 2014

(54) HISTORICAL VIEW OF OPEN FILES

(75) Inventor: Neil James Cochrane, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/547,238

(22) Filed: Jul. 12, 2012

(65) Prior Publication Data

US 2014/0019455 A1    Jan. 16, 2014

(51) Int. Cl.
G06F 17/30    (2006.01)
(52) U.S. Cl.
USPC ......................................................... 707/648
(58) Field of Classification Search
USPC ......................................................... 707/741
See application file for complete search history.

(56) References Cited

U.S. PATENT DOCUMENTS

2004/0153456 A1*   8/2004   Charnock et al. ............... 707/10
2006/0265249 A1*   11/2006  Follis et al. ...................... 705/3
2007/0046982 A1*   3/2007   Hull et al. ..................... 358/1.15

OTHER PUBLICATIONS

"Apple Time Capsule Automatic Backup for your Mac" downloaded from http://www.apple.com/timecapsule/backup.html on Aug. 14, 2012, 2 pages.
"Backup your Programs, System Settings, and Files" downloaded from http://windows.microsoft.com/en-us/windows7/Back-up-your-programs-system-settings-and-files on Aug. 14, 2012, 2 pages.
"Revision Control System" downloaded from http://en.wikipedia.org/wiki/Revision_Control_System on Aug. 14, 2012, 2 pages.
International Search Report and Written Opinion mailed on Oct. 29, 2013 for PCT Application No. PCT/US2013/050323, 13 pages.
Santry, Douglas J. et al.; "Elephant: The File System that Never Forgets,"; *Hot Topics in Operating Systems*; Proceedings of the Seventh Work Shop on Rio Rico, AZ, Mar. 29-30, 1999; pp. 2-7.

* cited by examiner

*Primary Examiner* — Sherief Badawi
*Assistant Examiner* — Courtney Harmon
(74) *Attorney, Agent, or Firm* — Kilpatrick Townsend and Stockton LLP

(57) ABSTRACT

Managing versions of an electronic entity comprising many independently managed, but mutually-dependent, subcomponents can be challenging. File management functionality is provided for use with an integrated development environment to produce a visual indication of the relationships among the subcomponents. The approach described herein provides an improvement over source code control systems and backup systems in the ability to revert the state of one or more files as their content existed at an historical time point. The technique does not require a user to predict in advance at which time points the content state of one or more files will be interesting as historical time points for future use.

26 Claims, 10 Drawing Sheets

HISTORICAL VIEW OF OPEN FILES

BACKGROUND OF THE INVENTION

The approach described herein is generally directed to version management of the contents of computer files. An electronic entity may comprise an aggregation of the content of files stored and maintained separately from one another, and some of these files may be mutually dependent. An example of such an entity may be source code for a software application, where the source code is distributed across multiple source files. Another example may be a master schedule distributed across files that contain task lists and due dates for multiple teams or individuals. Another example may be a book where the chapters are maintained separately in different files, but the chapters contain cross-references to locations within other chapters. Changes to an entity may require modifications to multiple files, and the entity may not be in a consistent state until all of the modifications are completed.

A common problem when developing or maintaining an electronic entity comprised of content stored in independently updated components, such as files, is obtaining a consistent snapshot of the entity at an historical point in time. Even though each component may progress through a sequence of states, it may be valuable to be able to visualize the overall state of the entity across all components. For example, a software development project may comprise multiple source files that are compiled and linked together to form an executable file. One source file may define a function that is called by code residing in a different source file. If the one source file is changed to redefine the function, code in the different source file that calls the function may need a corresponding change. Thus, the file containing the calling code has a dependency on the file defining the function, even though these files may be updated independently.

Many component files may have been opened, edited, and closed over time. Frequently, users have worked on files and decided that they want to revert their changes to an earlier state—e.g., they are unhappy with the last few hours of work and want to start over from an earlier point. However, reverting a set of related files to an historical time point may be time-consuming and error-prone. Previous attempts to provide tool support for this process have only allowed viewing changes for one file at a time and reverting changes one file at a time. Also, there has been no easy way to see a timeline showing changes in separate but related files.

Source code control systems may provide support for tracking versions of individual files, allowing a user to restore a file to any tracked version. A new version of a file may be created upon user request, and the version assigned a name. Some such systems also allow creating a named snapshot of a group of related files so that each file in the group of files can be rolled back to the named snapshot version. However, in order to roll back to a snapshot version, a user requests to create a snapshot in advance of needing to use it, and a user might not know a priori to which state they will want to roll back.

Backup systems store files, usually at a periodic interval or upon request, such that the system can use the stored files to revert the entire system state to what it was at the time when a backup was performed. The files backed up may include all files in the system, and these files might not be related to each other. Attempts have been made to support visually determining which backup should be used to restore the entire system, or from which backup a particular file or group of files should be restored. Apple's Time Machine Backup system provides a user interface that allows viewing folders as if flying through a time machine. The appearance of the folder at any time point provides clues regarding which backup contains which files. However, although this approach helps a user to identify the needed version of a particular file, it does not provide support for understanding the relationship among mutually dependent files wherever they may exist in a file system or distributed file system.

What is needed is an easy-to-use, intuitive way to look at a group of related files to determine at what snapshot in time the set of related files should be restored without having to rely on users creating and naming consistent snapshots a priori.

SUMMARY OF THE INVENTION

Systems and methods in accordance with various embodiments of the present invention can address the deficiencies in existing applications that perform file management by providing a user interface that allows users to view and revert the state of file content as it existed at an arbitrary time point, without a priori creating a checkpoint state for all files in the collection. The user interface may also provide a visual indication of the relationships between file states that comprise the state of a larger entity. For example, in an embodiment, a graph of a set of related files may be displayed by a processor on a computer display, the graph depicting, for each file of the set of related files, a starting point, an ending point, and one or more intermediate checkpoints. The starting point, the ending point, and the one or more intermediate checkpoints each represent a time point. Each time point is associated with a state of file contents for a file. For example, the current time "now" may be associated with the current state of a file. The processor may receive an input that indicates a particular time point that is earlier than the current time. The processor may create an environment comprising historical file contents of the set of related files as of the particular time point received.

DETAILED DESCRIPTION OF THE INVENTION

Many software applications include a component that performs custom file management. An example of one such software application is an integrated development environment (IDE). An IDE provides, for computer programmers, tools that support many aspects of software development that may include authoring, modifying, compiling, deploying and debugging software. The embodiments of the invention disclosed herein are described being performed by an IDE by way of example, though the approaches may be used for any software application performing version control of the content of multiple mutually dependent electronic components.

Projects are sometimes stored across multiple computer files. Users that work on these projects make changes to these files which may be interdependent. Making a change to one file may require a change to another file. A user may rely on an IDE to manage project files, and the IDE may have been used to open, edit, and close many files over time. Frequently, users have made changes to files, then decided to revert their changes to an earlier state—e.g., they are unhappy with the last few hours of work and want to start over from an earlier point. Restoring the state of one project file may require restoring states of other interdependent files.

The approach described herein provides a new kind of graph, showing the history of files that were opened, edited, and closed over time. In one embodiment, a graph is generated that shows a timeline along the bottom of the graph stretching backwards in time from 'Now'. Each file that has been opened is represented by a horizontal bar stretching backwards in time between the time it was opened (the starting point) and the time it was closed (the ending point), and the starting point and ending point have corresponding labeled time points on the timeline. In other embodiments, other kinds of graphs may be used in which each object in the graph represents a file and indicates its time of opening, closing, and intermediate saves.

Figure 1:
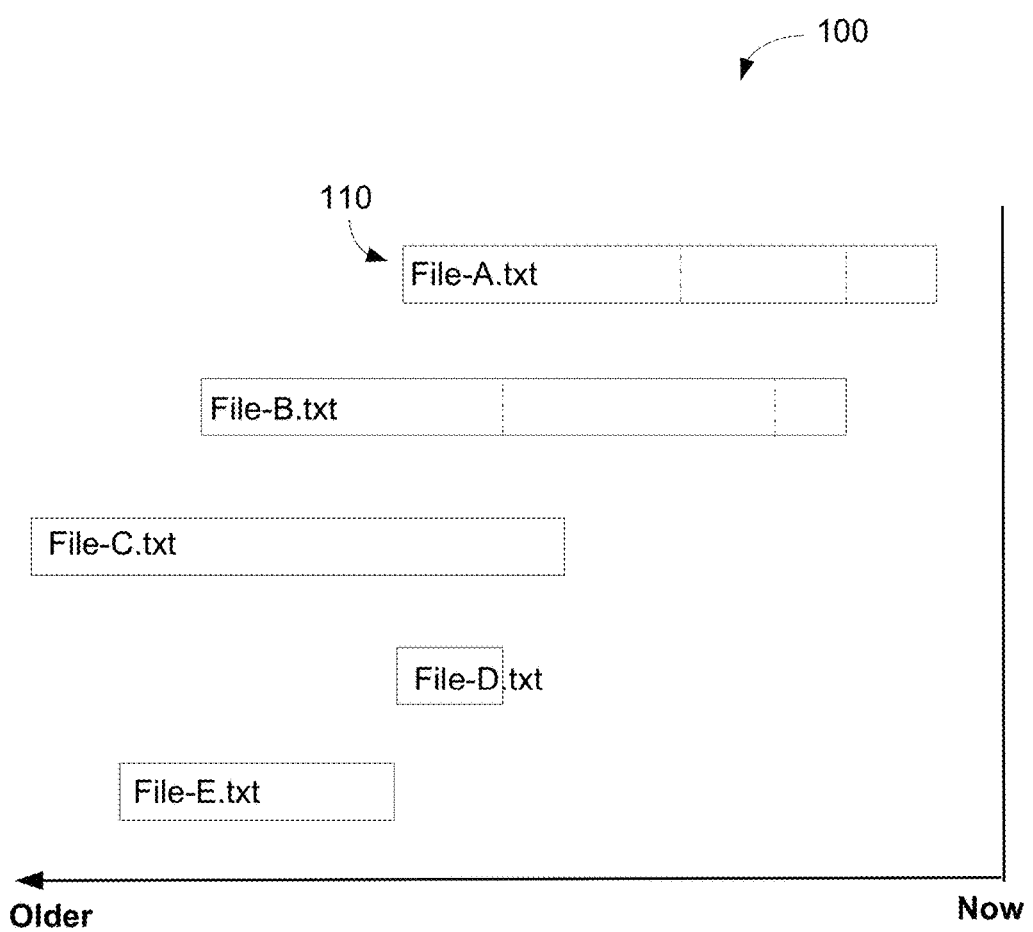
FIG. 1 illustrates a bar graph showing file status over time, according to an embodiment of the invention.

FIG. 1 illustrates a bar graph showing file status over time, according to an embodiment of the invention. The graph is drawn with portions of the Y axis representing distinct files and the X axis representing a timeline. The bars of the bar graph may be drawn parallel to the timeline. Each bar in the graph corresponds to a single file, and multiple bars occupying the same portion of the Y axis may represent the same file opened and closed multiple times. More specifically, bars at the same height on the Y axis may represent the same file, and bars at different heights may represent different files. The graph may show all of the files that were used within a particular time period. In the time period represented by example graph 100, five files were open and closed. The files are labeled by name and their width indicates the length of time they were open. For example, bar 110 represents a file named "File-A.txt" The current time (Now) is at the origin, and historical time is represented to the left of the origin (Older). The dotted line markings within a bar indicate when the corresponding file was saved (i.e., the dotted lines are positioned relative to the X axis corresponding to the time when the checkpoint occurred. The user may hover the mouse over any bar at any time point and can view an additional UI displaying the state of the corresponding file at that time point.

Figure 2:
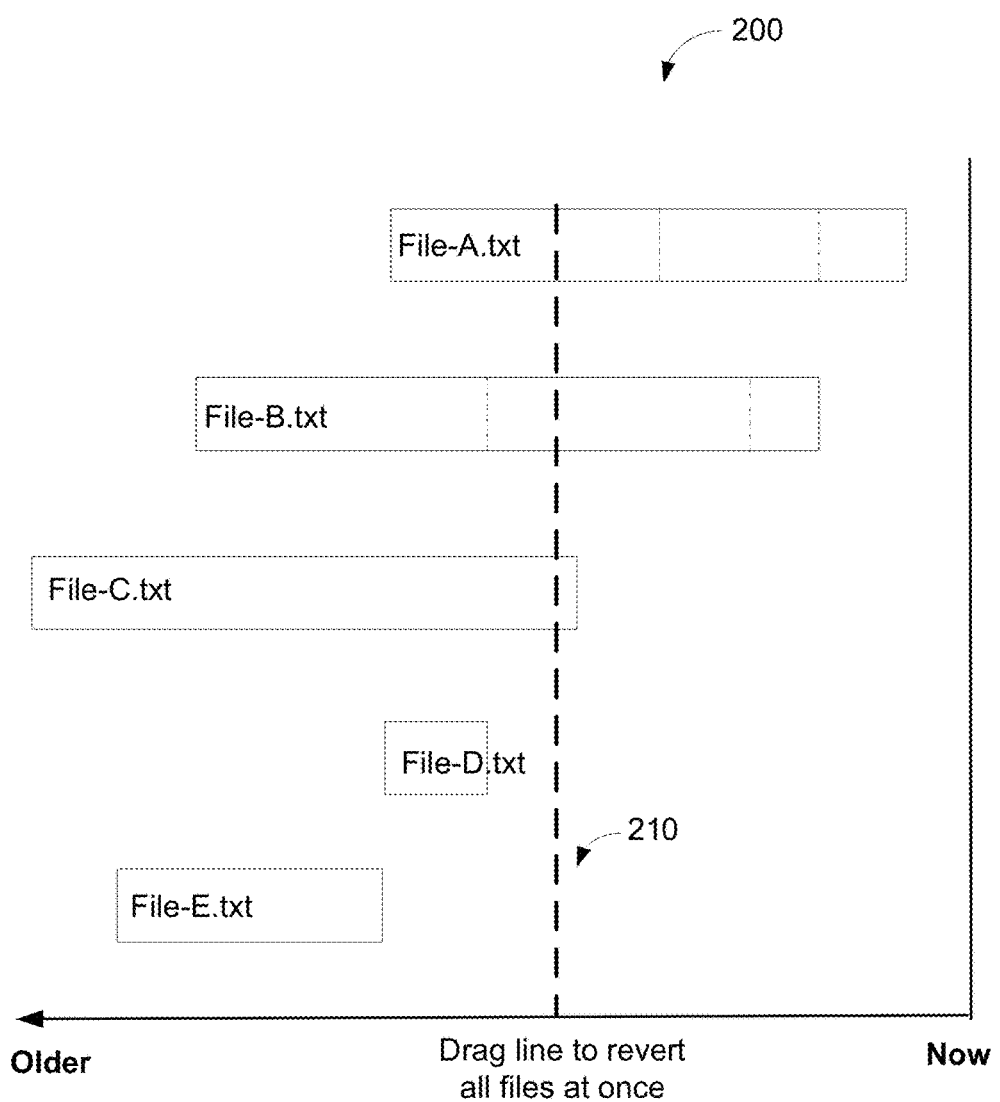
FIG. 2 illustrates a snapshot line for indicating the time at which the state of each of the files is to be restored, according to an embodiment of the invention.

FIG. 2 illustrates a snapshot line for specifying a time at which the state of each of the files is to be examined, according to an embodiment of the invention. Graph 200 depicts snapshot line 210 as a vertical dashed line, perpendicular to the timeline, that intersects all bars at the same particular time point. To select a time at which the state of all files is to be examined and potentially restored, the vertical line may be dragged left or right along the timeline. In an embodiment, the user may enter a time through the keyboard, or through any other mechanism for selecting a time, and the IDE may update the position of the snapshot line to intersect the files at the selected time point.

Figure 3A:
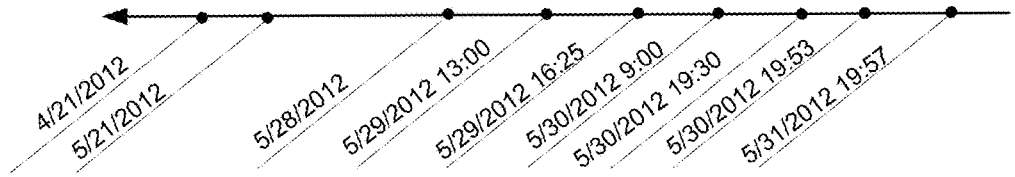
FIGS. 3a, 3b, and 3c illustrate time point labels on the historical timeline, according to embodiments of the invention.
Figure 3B:
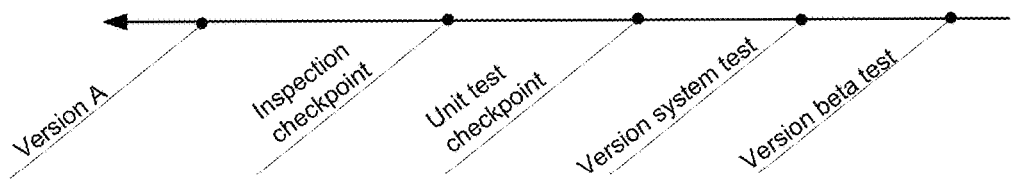
Figure 3C:
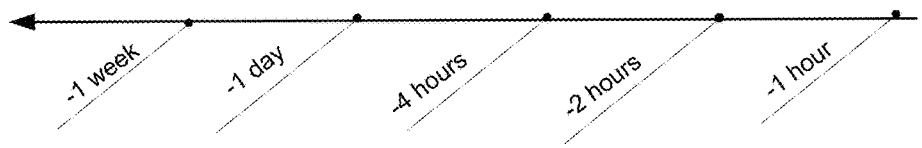

FIGS. 3*a*, 3*b*, and 3*c* illustrate time point labels on the historical timeline, according to embodiments of the invention. FIG. 3*a* shows, on the historical timeline, particular points that are labeled with a timestamp. In the example, the times when file open, save, and close events occurred are selected as labeled time points. These timestamps may be stored in association with the file events. In the figure, the oldest time point represents Apr. 21, 2012 and the most recent time point represents May 31, 2012 at 7:57 pm. The timeline may be to scale, or as shown in the example, the time points may not be to scale. In the example, recent time points are labeled with times including date, hour, and minute, whereas older time points might only be labeled using the day and hour or only the day. The idea behind this non-linear time scaling is that the oldest time points are likely to be the least interesting, so fewer older checkpoints may be displayed. The non-linear scaling also allows for displaying a wider time period than would be possible with linear scaling.

FIG. 3*b* illustrates the use of textual labels that have meaning to the user. For example, if the files are part of a software development project and the project lifecycle calls for checkpointing (saving state) all of the files at a particular lifecycle milestone, the name of the milestone may be more meaningful than the date and time at which the checkpoint occurred. Example labels displayed in FIG. 3*b* include Version A, Inspection checkpoint, Unit test checkpoint, Version system test, and Version beta test. When an event occurs, the user may be prompted to enter or select a label to associate the event. A time point label may also be changed by selecting a label on the timeline and renaming it with a new textual label.

FIG. 3*c* illustrates the use of relative time labels that are selected based on the number and distribution of changes over time. For example, the right-most time point, "−1 hour," represents one hour before the current time. Though the actual time of file open, save, and close events may be used to determine which relative time points to display, the labeled time points need not coincide with the times that file events occurred. In an embodiment, the starting point, ending point, and intermediate save points represented by vertical lines in the graph may each be additionally labeled with the time at which the corresponding event occurred. In another embodiment, the actual time at which file event occurred may be displayed when the cursor points to or selects a vertical line within a bar.

Figure 4:
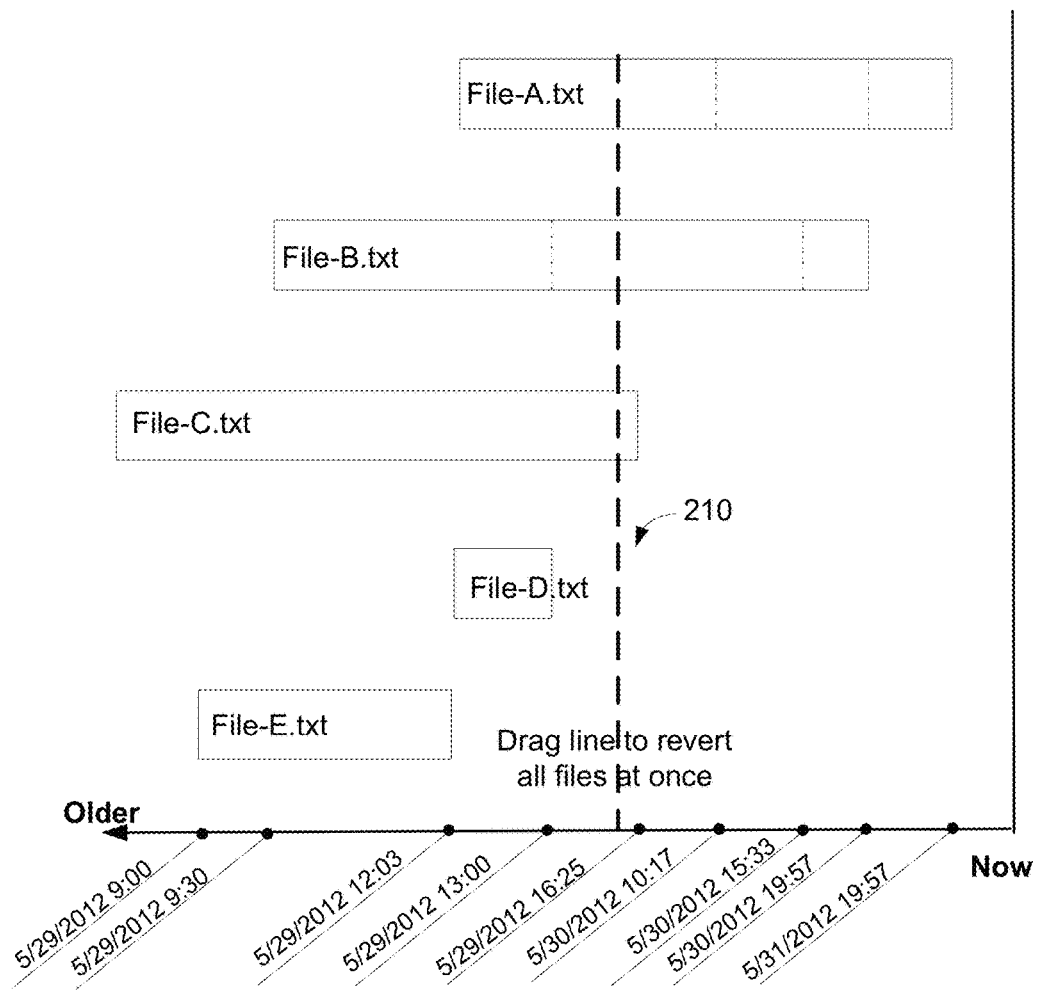
FIG. 4 illustrates selecting an historical time point, according to an embodiment of the invention.

The user can select an arbitrary historical time point and examine the state of content stored in an individual file as of the selected time point. FIG. 4 illustrates selecting an historical time point, according to an embodiment of the invention. The user can slide the vertical line across the graph to indicate the time at which the state of the files is desired.

Figure 5:
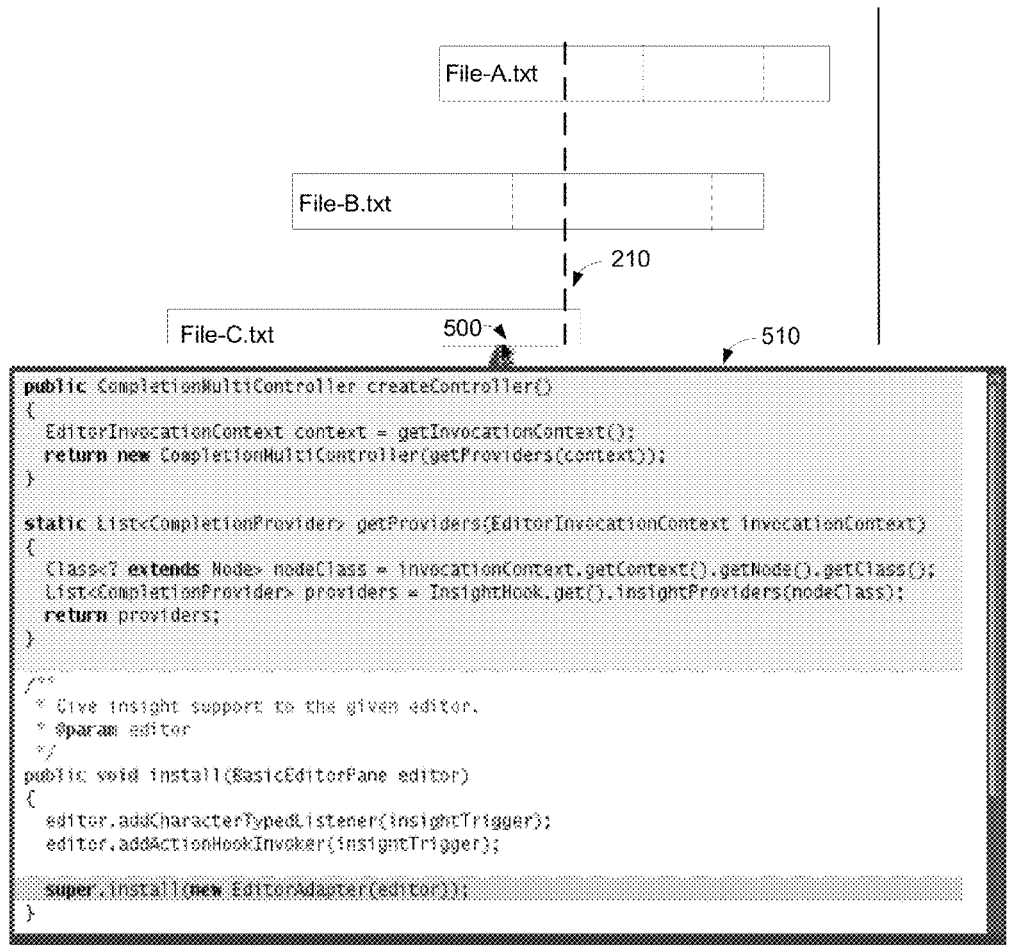
FIG. 5 illustrates viewing the state of a file at a particular time point, according to an embodiment of the invention.

FIG. 5 illustrates viewing the state of a file at a particular time point, according to an embodiment of the invention. In an embodiment, the file and the desired time point may be selected based on the position of the cursor 500. For example, a file may be selected by positioning the cursor over a bar representing the file. Similarly, the desired time point may be selected based on the position of the cursor relative to the timeline. The cursor position may be determined by hovering the cursor or by clicking a mouse button. In an alternate embodiment, the location of the snapshot line may determine the time point for any file being examined. In an embodiment, the file may be selected by typing the file name into a text box or selecting the file name from a drop-down or popup menu.

Once the desired time point and file are selected, the state of the content in the selected file may be displayed as of the selected time point. The example in FIG. 5 shows the mouse hovering over a bar representing the file of interest, File_C.txt. The file content as of the selected time point may be presented in a popup window 510. In an embodiment, the entire content of the file may be displayed as of the time point, independent of the current state of the file. In another embodiment, the display of the file content may include the union of content between the historical version and the current version and indicate how the content has changed between the historical version and the current version. Ways of identifying differences between versions of a file may include, for example, using color, underlining, and/or strike-through notations for identifying changed elements. In FIG. 5, the shaded area may indicate content that was changed since the selected historical time point. In yet another embodiment, only differences between historic state and current state are displayed, and content common to both the historical version and the current version may not be displayed.

The user may inspect the state of certain files at a time point to verify that the correct time point has been selected. Once verified, the user may request to create an environment in which all of the files revert to the state they had at the selected time point. For example, referring to FIG. 4, if the user requested to create an environment based on the time point selected by the position of the snapshot line, the environment would include a version of File-A.txt as it was opened, File-B.txt after it was saved the first time, and File-C.txt just before it was closed. Files File-D.txt and File-E.txt would not be present in the environment because they were not open between May 29, 2012 13:00 and May 20, 2012 10:17.

In an embodiment, changes made to files between checkpoints, for example between opening and saving or between saves, would not be reflected in the state. The state of each file would be the state as of its last open or save. Saving the contents of one or more files may be triggered by the user (user-initiated) or may be triggered by a timer in the IDE. In an embodiment, the dotted saved lines in each bar may represent user-initiated saves. A user-initiated save may save an individual file or may save all files at the same time point. Even though the IDE may iterate sequentially through the files to save multiple files, and thus, the actual save time across files may be different, the IDE may assign a common time point as the save point for each file in the collection. In addition, the IDE may automatically save a snapshot of files in-between user-initiated saves. The automatic snapshots may be indicated within the bars using the same dotted lines, using some other notation, or not at all. The state of the file at a particular time point may then be the state of the file since the last checkpoint whether the user or the IDE initiated the save.

Figure 6:
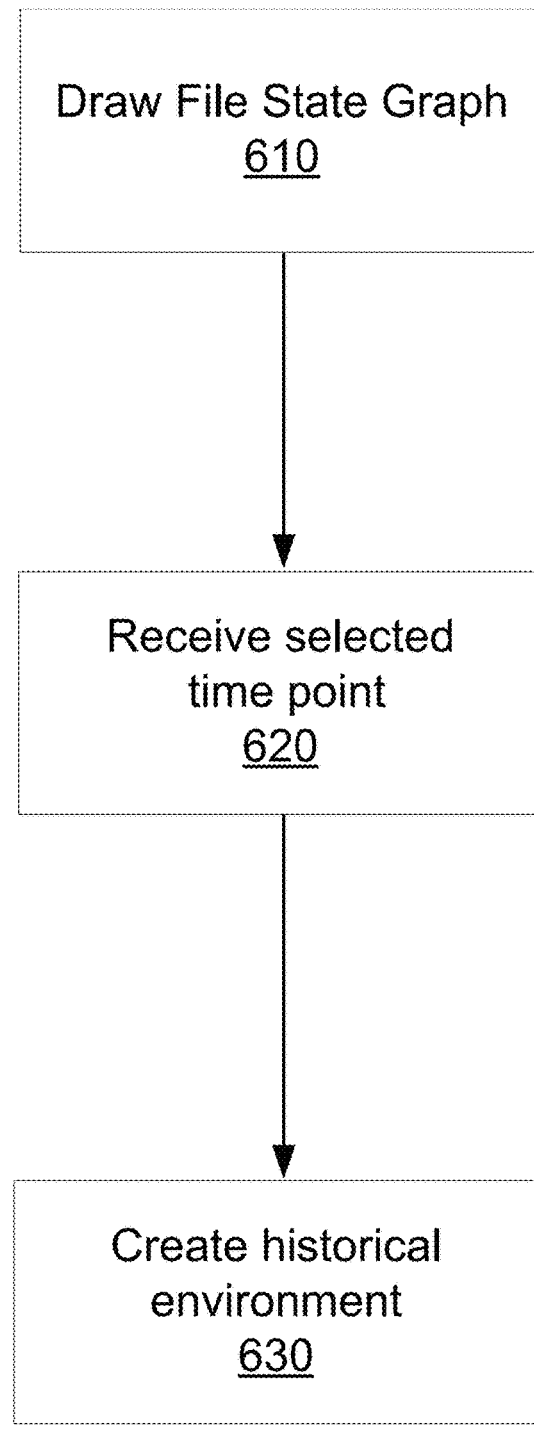
FIG. 6 illustrates the high level steps associated with the technique described herein, according to an embodiment.

FIG. 6 illustrates the high level steps associated with the technique described herein, according to an embodiment. In step 610, the graph of the file states associated with a particular time period is generated and displayed. In step 620, the IDE receives user input that indicates a desired time point. In response to receiving the desired time point, the snapshot line is redrawn to intersect the timeline at the desired time point. In step 630, a new environment may be created comprising files in their state as of the desired time point.

To implement these high level steps, a graphing environment and a store of historical data may be used. The graphing environment at its most basic is a graphical computer user interface with the ability to draw arbitrary lines and text on it. The data store may contain a list of all files that were opened by the IDE, the time when each was opened and closed, and the state of the files at various points in time while they were opened. The IDE may include a controlling mechanism that intercepts opening, closing, and saving of files. When one of these events occurs, data associated with the event may be placed into the data store for that file.

Figure 7:
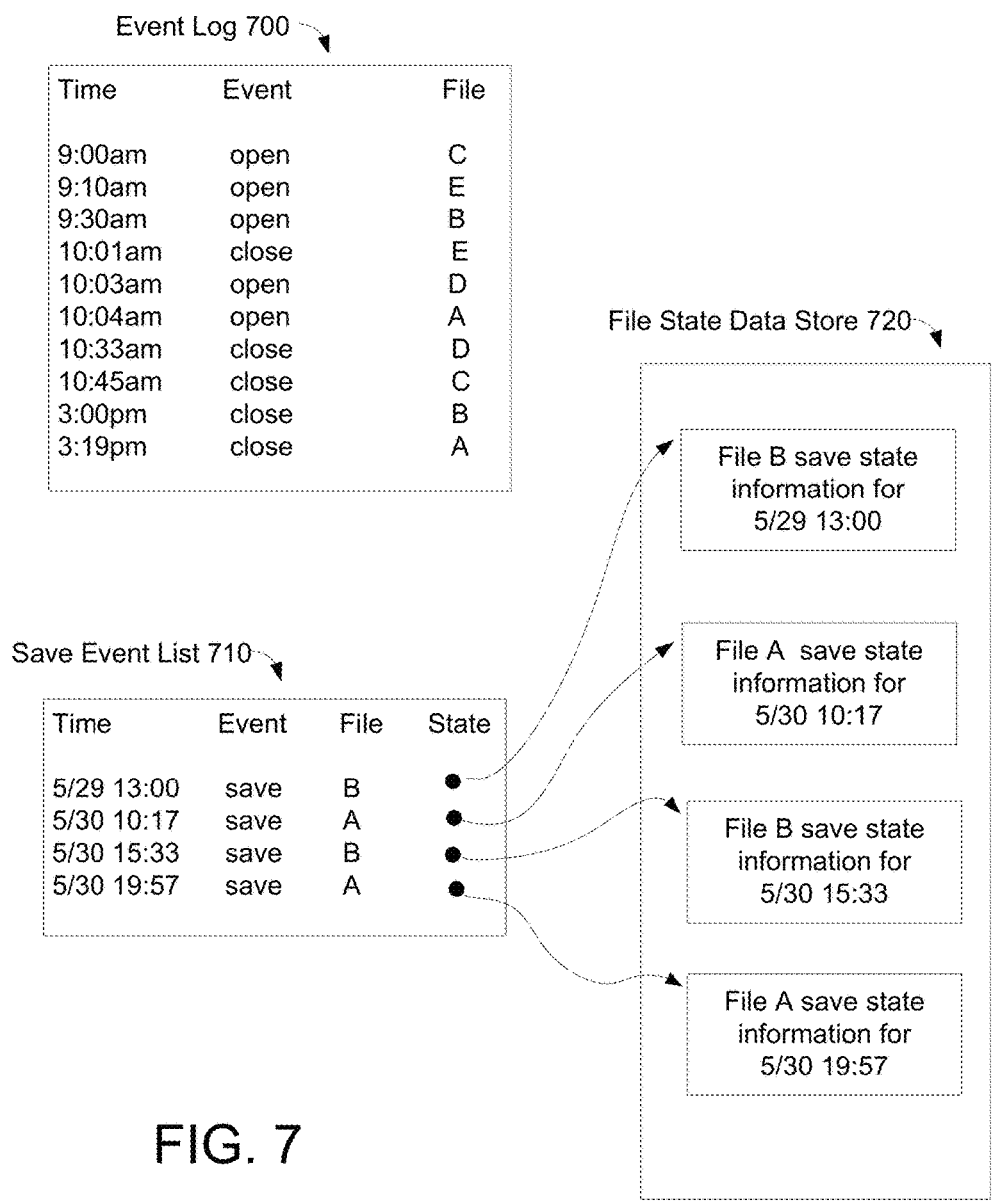
FIG. 7 illustrates data stores used to re-create file state, according to an embodiment of the invention.

FIG. 7 shows example data stored for re-creating file state, according to an embodiment of the invention. Event log 700 is a time-ordered list of file open and file close events. Event log 700 may be used for determining which files were open at any point in time as well as for determining how to graph each file on the timeline. In an embodiment of the invention, a save event list 710 that is separate and distinct from event log 700, may be used for recording the time when the content of each file was saved. In the example given above of check pointing all files together, a representative time point is selected, and all the files would be recorded in the save event list with this same representative time.

In an embodiment, the event log 700 and the event save list 710 may include an additional column for storing a textual label associated with the event.

The state of each file as saved may be stored in yet another data store referred to herein as the file state data store 720. When modifications to a file are saved, information needed to reconstruct the file state as of that time point is saved in the file state data store 720. In an embodiment an entire copy of the file contents may be stored. In an alternate embodiment, changes made since the last checkpoint may be written to the file state data store 720. In an embodiment, the event log 700 and save event list 710 may be merged into a single time-sorted list.

Figure 8:
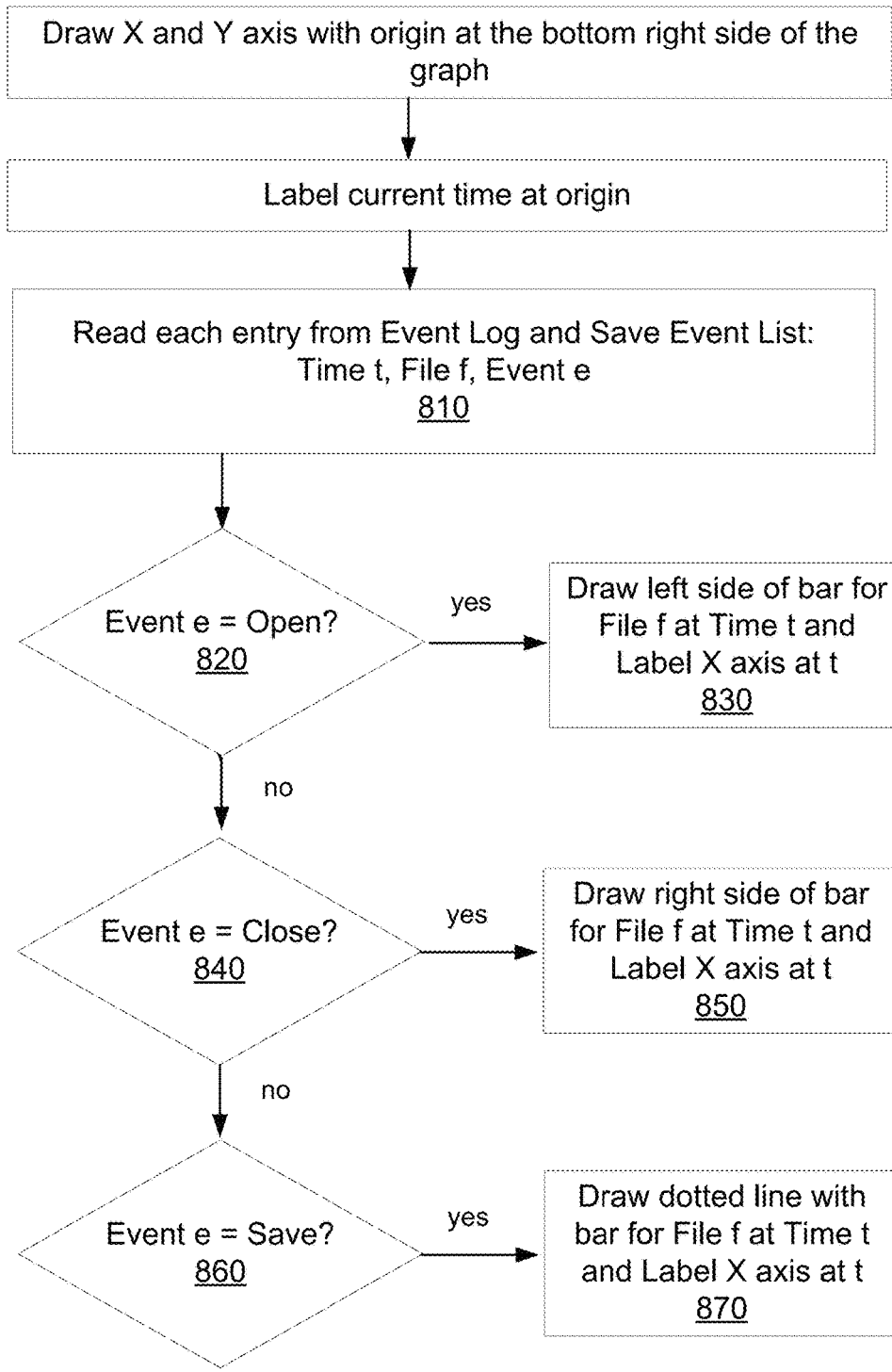
FIG. 8 is a flow diagram of producing the file state graph, according to an embodiment of the invention.

When the user requests to view a graph of the related files, the historical time period over which the state of files will be displayed is determined. The historical time period is the amount of time back from the current time that will be represented by the graph timeline. The historical time period may be received as input from the user, may be configured within the IDE, or may be dynamically determined based on rules that consider at least the number of events stored in the event log and the time period that includes the events. FIG. 8 is a flow diagram illustrating the production of the file state graph, according to an embodiment of the invention. The event log may be read in chronological order starting with the first time entry after the start of the time period that the graph represents. For example, based on the example data shown in FIG. 7, if the current time is 3:30 pm and the graph is to represent file states starting at 10:00 am earlier the same day, then the first entry read from the event log will be the event that occurred at 10:01 am. In step 810, the next event log entry is read including the time, the type of event, and the file name. In step 820, if the type of event is an open file event, then in step 830, a new bar is created to represent this file with the left side of the bar drawn relative to the X axis corresponding to when the file was opened. If the event is not an open file event, then in step 840 the event is tested to verify that it is a close file event. If the event is a close file event, then in step 850 the bar for this file is completed by drawing the right side of the bar at the time point read from the close event, and the left side and right side of the bar are connected to form the top and bottom of the rectangular bar. The save file events that occurred within the time period represented by the graph are read, and a line may be drawn within the bar at a position in line with the time point at which the save occurred.

The snapshot line may be initially drawn at a configured location such as in the middle of the timeline, at the last time point where the snapshot line was used to request examining historical file content or creating an historical environment, or at a time point representing a certain amount of time in the past from the current time.

Once the user affirmatively selects a time point of interest, for example by sliding the snapshot line to the time point of interest, the user may indicate a file for inspection. An indication of the state of the selected file may be retrieved and displayed by looking up the time point of interest in the save event list. The save event list may be indexed by time. The save list entry corresponding to the time point of interest for the desired file may be found, and the file reference may be used to retrieve the saved state of the file. Based on the saved state of the file, the state of the file may be re-created. In an embodiment, the save event list may be indexed by textual labels instead of or in addition to being indexed by time.

Figure 9:
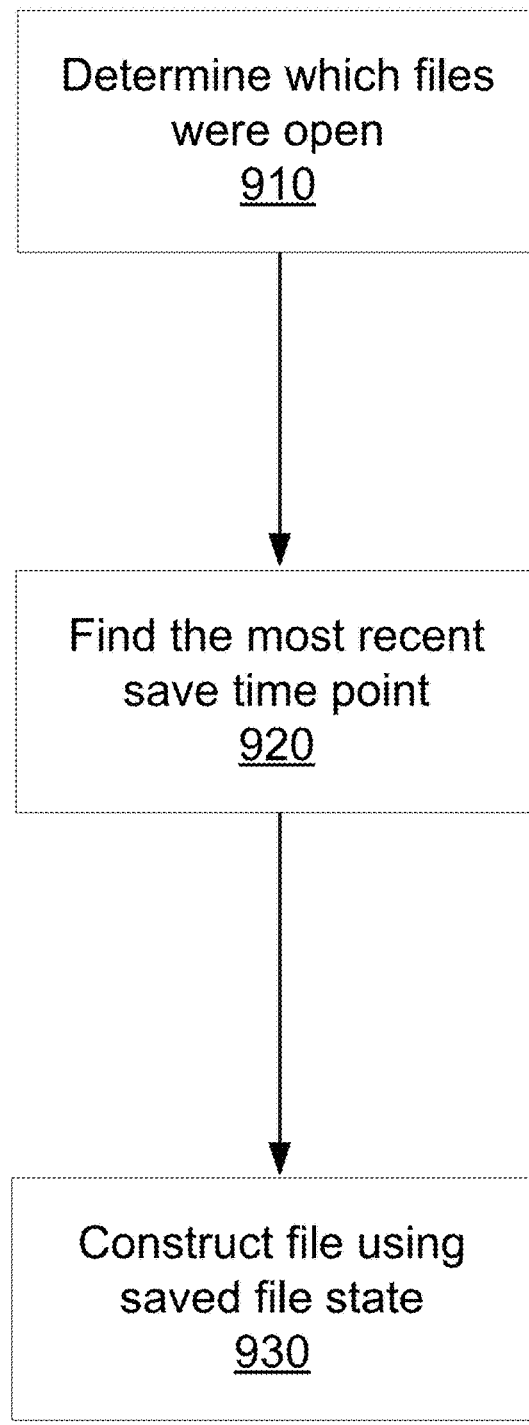
FIG. 9 is a flow diagram of re-creating an environment of files that were open at a particular time point, according to an embodiment of the invention.

FIG. 9 is a flow diagram of re-creating an environment of files that were open at a particular time point, according to an embodiment of the invention. In step 910, the IDE determines which files were open at the particular time point. The location of entries in the event log corresponding to the particular time point is used as a starting place. For each file in the group of related files, the log entries may be searched backward in time to find the last event that occurred for the file. If the last event was an open event, then the file was open, and if the last event was a close event, then the file was closed. In step 920, for each open file, the last save event entry is identified in the save event list before the particular time point. Using a reference in the save event entry, the file state may be determined using the saved file state information from the file state data store in step 930.

Figure 10:
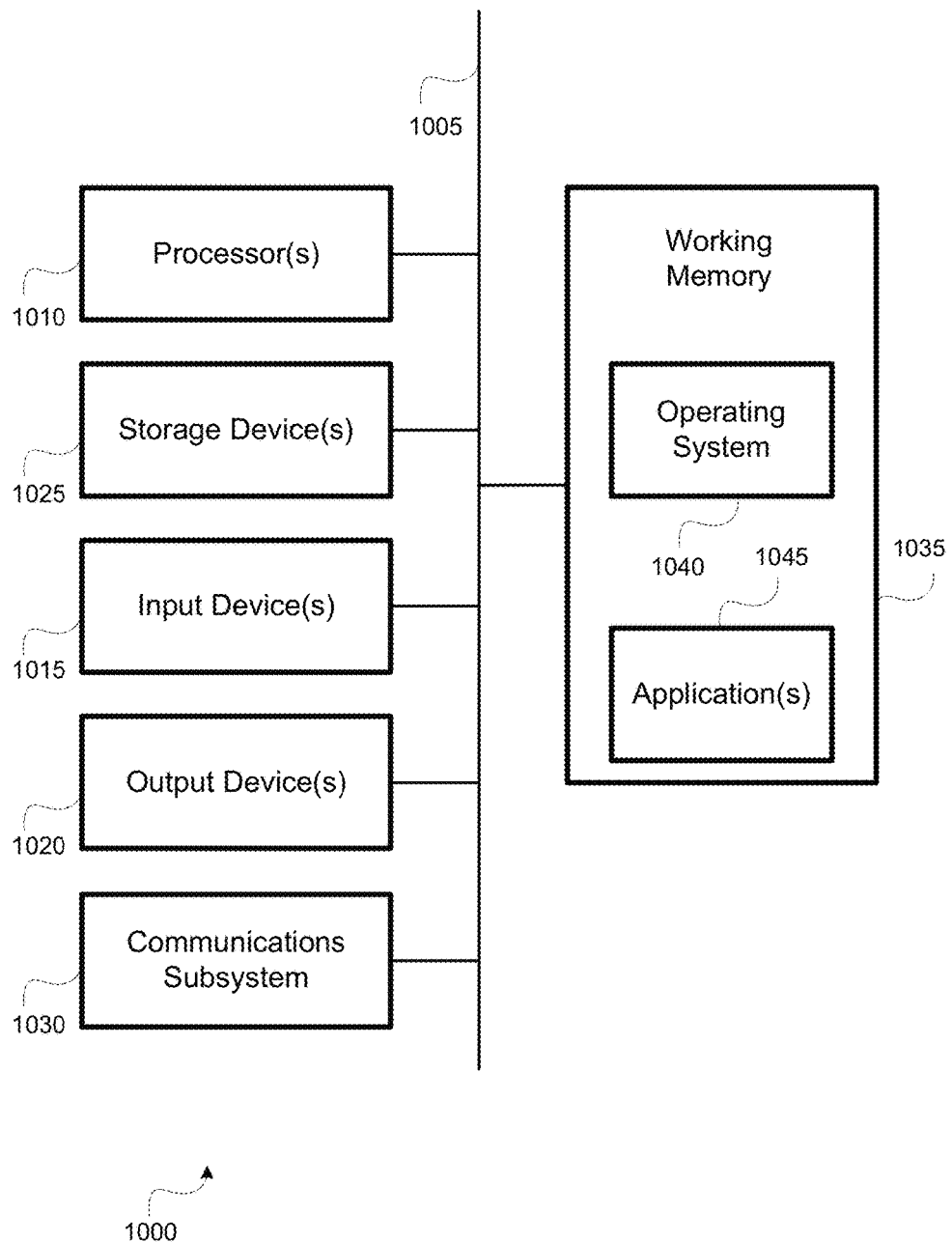
FIG. 10 is a block diagram of a computer system on which an embodiment may be implemented.

FIG. 10 illustrates an embodiment of a computer system that may be used to implement the approach described herein. A computer system as illustrated in FIG. 10 may be incorporated as part of the previously described systems and may be used to perform the previously described methods. For example, computer system 1000 can execute applications performing file management, graphical user interfaces, software development environments. Computer system 1000 may access storage structures, such as storage structures 700, 710, and 720. FIG. 10 provides a schematic illustration of one embodiment of a computer system 1000 that can perform the methods provided by various embodiments, as described herein. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include without limitation a mouse, a keyboard, and/or the like; and one or more output devices 1020, which can include without limitation a display device, a printer, and/or the like.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1030 may permit data to be exchanged with a network (such as the network described below, to name one example), other computer systems, and/or any other devices described herein. In many embodiments, the computer system 1000 will further comprise a working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1025 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1000) to perform methods in accordance with various embodiments of the invention. According to a set of embodiments, some or all of the procedures of such methods are performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1025. Volatile media include, without limitation, dynamic memory, such as the working memory 1035.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000.

The communications subsystem 1030 (and/or components thereof) generally will receive signals, and the bus 1005 then might carry the signals (and/or the data, instructions, etc. carried by the signals) to the working memory 1035, from which the processor(s) 1010 retrieves and executes the instructions. The instructions received by the working memory 1035 may optionally be stored on a non-transitory storage device 1025 either before or after execution by the processor(s) 1010.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A computer-implemented method comprising:
    displaying, by a processor, a graph of a set of interdependent files on a computer display, the graph depicting, for each file of the set of interdependent files, a graphical representation of a state of the file over a time period, including a starting point, an ending point, and one or more intermediate checkpoints, wherein the set of interdependent files are related such that a change to a state of a first file in the set of interdependent files requires a change to a state of a second file in the set of interdependent files;
    wherein, for each file, the starting point represents a time when the file was opened for editing, the ending point represents a time when the file was closed, and the one or more intermediate checkpoints each represent a different time point the state of the file was saved;
    receiving, by the processor, a request to create an environment corresponding to a particular time point in the time period;
    determining, by the processor, a subset of the interdependent files that were open at the particular time point based on the state of each file in the set of interdependent files at the particular time point, wherein each file in the subset of the interdependent files is depicted as a member of the subset at the particular time point in the graph of the set of interdependent files; and
    creating, by the processor, the environment corresponding to the particular time point comprising the set of interdependent files, wherein file contents of each file in the subset of interdependent files is reverted to reflect the state of each file at the particular time point.

2. The computer-implemented method of claim 1, wherein:
    the graph of the set of interdependent files is a bar graph with one or more bars representing said each file in the set of interdependent files, wherein one side of a bar of the one or more bars is positioned relative to a time point on the timeline corresponding to the starting point for said each file;

another side of the bar is positioned relative to a time point on the timeline corresponding to the ending point for said each file; and displaying one or more marks within the bar, each mark positioned relative to a time point on the timeline corresponding to an intermediate checkpoint for said each file.

3. The computer-implemented method of claim 1, wherein:

the timeline is displayed as a horizontal line; and the one or more bars each representing a file are displayed parallel to the timeline such that a vertical line intersecting the timeline at a historical time point also intersects each bar at a side or a mark that corresponds to the historical time point.

4. The computer-implemented method of claim 1, wherein receiving input that indicates a particular time point on the timeline further comprises:

displaying a line perpendicular to the timeline, the perpendicular line representing a historical snapshot in time;

in response to receiving input, displaying the perpendicular line moving to intersect the timeline at the particular time point, wherein the perpendicular line intersects each file in the subset of interdependent files.

5. The computer-implemented method of claim 1, wherein displaying the graph further comprises:

retrieving a first list of files that were open during the time period;

for each file in the set of interdependent files that were open at any time within the time period:

retrieving a time within the time period when said each file was opened as a first file open time point, and retrieving a corresponding time when said each file was closed as a first file close time point;

displaying a first bar having one side positioned according to the first file open time point and another side positioned according to the first file close time point;

retrieving one or more times when said each file was saved as first file save time points, wherein a first file save time point is between the first file open time point and the first file close time point;

displaying one or more marks on the first bar, each mark corresponding to one of the one or more first file save time points.

6. The computer-implemented method of claim 5, wherein displaying the graph further comprises, for each file in the first list of files:

retrieving a time within the time period when said each file was opened as a second file open time point, and retrieving a corresponding time when said each file was closed as a second file close time point;

wherein the second file open time point is after the first file close time point;

displaying a second bar having one side positioned according to the second file open time point and another side positioned according to the second file close time point;

retrieving one or more times when said each file was saved as second file save time points, wherein a second file save time point is between the second file open time point and the second file close time point;

displaying one or more marks on the second bar, each mark corresponding to one of the one or more second file save time points.

7. The computer-implemented method of claim 5, wherein retrieving the first list of files is based on a time-based index.

8. The computer-implemented method of claim 5, wherein retrieving the first file save time points further comprises retrieving the first file save time points from a table outside of the time-based index.

9. The computer-implemented method of claim 1, wherein the set of interdependent files belong to a common project;

wherein a plurality of the files in the set of interdependent files reside within a common directory; and wherein at least one file of the set of interdependent files that resides outside of the common directory.

10. The computer-implemented method of claim 1, wherein the set of interdependent files comprises source files managed within an integrated development environment, each source file containing text that conforms to a computer programming language.

11. The computer-implemented method of claim 10, further comprises the integrated development environment:

receiving a trigger at a file save time point to save one or more open files in the integrated development environment;

receiving a label for identifying the file save time point in the graph;

creating an index entry to index the saved one or more open files based on the label.

12. The computer-implemented method of claim 11, wherein the label is a timestamp that indicates when the trigger was received.

13. The computer-implemented method of claim 11, wherein the label is the name of a milestone that is not a timestamp.

14. The computer-implement method of claim 11, wherein the trigger is generated in response to a user request to save the one or more open files.

15. The computer-implemented method of claim 11, wherein the trigger is generated based on a timer.

16. A system comprising:

a computer, including a computer readable medium and processor, wherein the computer is coupled to a computer display;

a file management application, executing on the computer, wherein the file management application is configured to display a graph of a set of interdependent files on a computer display, the graph depicting, for each file of the set of interdependent files, a graphical representation of a state of the file over a time period, including a starting point, an ending point, and one or more intermediate checkpoints, wherein the set of interdependent files are related such that a change to a state of a first file in the set of interdependent files requires a change to a state of a second file in the set of interdependent files;

wherein, for each file, the starting point represents a time when the file was opened for editing, the ending point represents a time when the file was closed, and the one or more intermediate checkpoints each represent a different time point the state of the file was saved;

receive a request to create an environment corresponding to a particular time point in the time period;

determine a subset of the interdependent files that were open at the particular time point based on the state of each file in the set of interdependent files at the particular time point, wherein each file in the subset of the interdependent files is depicted as a member of the subset at the particular time point in the graph of the set of interdependent files; and create the environment corresponding to the particular time point comprising the set of interdependent files, wherein file contents of each file in the subset of interdependent files is reverted to reflect the state of each file at the particular time point.

17. The system of claim 16, wherein:
the timeline is displayed as a horizontal line; and
the one or more bars each representing a file are displayed parallel to the timeline such that a vertical line intersecting the timeline at a historical time point also intersects each bar at a side or a mark that corresponds to the historical time point.

18. The system of claim 16, wherein the file management application is further configured to:
display a line perpendicular to the timeline, the perpendicular line representing a historical snapshot in time;
in response to receiving input, display the perpendicular line moving to intersect the timeline at the particular time point, wherein the perpendicular line intersects each file in the subset of interdependent files.

19. The system of claim 16, wherein:
the starting point for a file represents a time when said each file in the set of interdependent files is opened;
the ending point for the file represents a time when said each file is closed; and
each intermediate checkpoint of the intermediate checkpoints for said each file represent a time when said each file was saved.

20. The system of claim 19, wherein the file management application is further configured to:
retrieve a first list of files that were open during the time period; and
for each file in the set of interdependent files that were open at any time within the time period:
retrieve a time within the time period when said each file was opened as a first file open time point, and retrieve a corresponding time when said each file was closed as a first file close time point;
display a first bar having one side positioned according to the first file open time point and another side positioned according to the first file close time point;
retrieve one or more times when said each file was saved as first file save time points, wherein a first file save time point is between the first file open time point and the first file close time point; and
display one or more marks on the first bar, each mark corresponding to one of the one or more first file save time points.

21. The system of claim 20, wherein the file management application is further configured to:
retrieve a time within the time period when said each file was opened as a second file open time point, and retrieve a corresponding time when said each file was closed as a second file close time point;
wherein the second file open time point is after the first file close time point;
display a second bar having one side positioned according to the second file open time point and another side positioned according to the second file close time point;
retrieve one or more times when said each file was saved as second file save time points, wherein a second file save time point is between the second file open time point and the second file close time point;
display one or more marks on the second bar, each mark corresponding to one of the one or more second file save time points.

22. The system of claim 21, wherein the file management application is further configured to retrieve the first list of files based on a time-based index.

23. The system of claim 21, wherein retrieving the first file save time points further comprises retrieving the first file save time points from a table outside of the time-based index.

24. The system of claim 16, wherein the file management application is an integrated development environment, wherein the set of interdependent files comprises source files managed within the integrated development environment, each source file containing text that conforms to a computer programming language, and wherein the integrated development environment is configured to:
receive a trigger at a file save time point to save one or more open files;
receive a label for identifying the file save time point in the graph;
create an index entry to index the saved one or more open files based on the label.

25. The system of claim 24, wherein:
the label is one or more of a timestamp that indicates when the trigger was received and a name of a milestone that is not a timestamp; and
the trigger is generated based on one or more of a user request to save the one or more open files, and a timer.

26. A computer-implemented method comprising:
receiving, by a processor, a request to display a plurality of interdependent files, wherein the plurality of interdependent files are related such that a change to the content of a first file requires a change to the content of a second file, and wherein the request includes a time period including a start time point and an end time point;
parsing, by the processor, an event log to identify a state of each file in the plurality of interdependent files between the start time point and the end time point, wherein the event log includes a plurality of chronologically ordered events related to one or more of the plurality of interdependent files;
determining, by the processor, for each event in the event log between the start time point and the end time point, a file in the plurality of interdependent files associated with the event, an event time associated with the event, and an event type associated with the event;
displaying, by the processor, a representation of the state of each of the plurality of interdependent files associated with at least one event between the start time point and the end time point, wherein the state of each file associated with an open event is depicted by a bar;
receiving, by the processor, a request to revert a state of a first file in the plurality of interdependent files, wherein the request includes a selected time point between the start time point and the end time point;
identifying, by the processor, a subset of the plurality of interdependent files, wherein each file in the subset is associated with an open event at or prior to the selected time point and a close event after the selected time point; and
reverting, by the processor, the state of the first file and each of the subset of the plurality of interdependent files.

* * * * *

UNITED STATES PATENT AND TRADEMARK OFFICE
CERTIFICATE OF CORRECTION

PATENT NO.       : 8,886,608 B2                                           Page 1 of 1
APPLICATION NO.  : 13/547238
DATED            : November 11, 2014
INVENTOR(S)      : Cochrane It is certified that error appears in the above-identified patent and that said Letters Patent is hereby corrected as shown below:

In the Specification

In column 5, line 5, delete "File_C.txt." and insert -- File-C.txt. --, therefor.

Signed and Sealed this
Twenty-third Day of June, 2015

Michelle K. Lee
*Director of the United States Patent and Trademark Office*